United States Patent [19]

Brofman et al.

[11] Patent Number: 5,284,286
[45] Date of Patent: Feb. 8, 1994

[54] POROUS METAL BLOCK FOR REMOVING SOLDER OR BRAZE FROM A SUBSTATE AND A PROCESS FOR MAKING THE SAME

[75] Inventors: Peter J. Brofman; Shaji Farooq; Kathleen A. Lidestri, all of Hopewell Junction; Gregg B. Monjeau, Wallkill; Karl J. Puttlitz, Wappingers Falls, all of N.Y.

[73] Assignee: International Business Machines Corporation, Armonk, N.Y.

[21] Appl. No.: 786,201

[22] Filed: Oct. 31, 1991

[51] Int. Cl.⁵ .............................. B23K 1/018
[52] U.S. Cl. ..................... 228/19; 228/119; 228/264; 419/2
[58] Field of Search ............ 228/119, 19, 264; 419/2

[56] References Cited

U.S. PATENT DOCUMENTS

| | | | |
|---|---|---|---|
| 2,219,423 | 10/1940 | Kurtz | 75/22 |
| 3,661,571 | 5/1972 | Hintermann et al. | 419/2 |
| 3,713,787 | 1/1973 | Kuniyasu et al. | 29/182.2 |
| 3,746,239 | 7/1973 | Auray | 228/19 |
| 4,164,606 | 8/1979 | Spirig | 428/605 |
| 4,323,631 | 4/1982 | Spirig | 428/605 |
| 4,416,408 | 11/1983 | Spirig | 228/19 |
| 4,654,195 | 3/1987 | Wnuck et al. | 419/2 |
| 5,065,931 | 11/1991 | Liu et al. | 228/19 |
| 5,083,698 | 1/1992 | Forsha | 228/19 X |

FOREIGN PATENT DOCUMENTS 162811 11/1954 Australia .
60-54361 11/1985 Japan .
661780 11/1951 United Kingdom .

OTHER PUBLICATIONS

R. M. Poliak, et al., "Solder Wick" IBM Technical Disclosure Bulletin, vol. 13, No. 2 p. 445 (Jul. 1970).
G. A. Caccoma, et al., "Desoldering Unit" IBM Technical Disclosure Bulletin, vol. 21, No. 11, p. 4482 (Apr. 1979).
B. LePape, "Use Of A Tinned Copper Slug For Module Reworking" IBM Technical Disclosure Bulletin, vol. 24, No. 7A, p. 3481 (Dec. 1981).
J. Lamoureaux, et al., "Used Electronic Module Pin Solder Dress Process" IBM Technical Disclosure Bulletin, vol. 24, No. 10, pp. 5170-5171 (Mar. 1982).
R. J. Moore, et al., "Method For Manufacturing Porous Metal Devices" IBM Technical Disclosure Bulletin, vol. 25, No. 5, p. 2285 (Oct. 1982).
"Chip Rework On Multilayer Ceramic Recess" IBM Technical Disclosure Bulletin, vol. 27, No. 10B, pp. 6344-6345 (Mar. 1985).

Primary Examiner—Kenneth J. Ramsey
Attorney, Agent, or Firm—Aziz M. Ahsan

[57] ABSTRACT

A porous metal block for selectively removing solder or braze from a substrate is disclosed. The block comprises a plurality of protrusions which absorb solder or braze through capillary action. The number and dimensions of the protrusions vary depending on the application. Also disclosed is a process for making such a block involving a unique two steps sintering process.

9 Claims, 2 Drawing Sheets

POROUS METAL BLOCK FOR REMOVING SOLDER OR BRAZE FROM A SUBSTATE AND A PROCESS FOR MAKING THE SAME

FIELD OF THE INVENTION

This invention relates generally to a porous metal block for removing solder or braze from a surface and a process for making such a block. More specifically, this invention relates to selectively removing solder or braze from a substrate using a porous metal block.

BACKGROUND OF THE INVENTION

A current scheme for making changes to electronic substrates, such as ceramic, glass or glass-ceramic substrates, uses redundant connection pads to add new connections or delete existing connections. The original connections from the integrated circuit chips, hereinafter referred to as IC's, to the electronic substrate are normally made using solder or braze connections between the IC's and the connection pads located beneath the IC's. Surplus connection pads, each of which is connected to an original connection pad, are located around the periphery of the IC's. New or additional connections may be made between redundant connection pads, for example, by wire bonding, staple bonding or by the use of decals. Connections may be deleted by severing the line connecting a redundant pad to an original pad. If, during electronic substrate rework, an IC must be removed and replaced, solder and braze removal is limited to the area that was directly below the IC, leaving the peripheral connections undisturbed.

However, because space on a substrate is both scarce and valuable, it is desirable to use the available space between the original connection pads beneath the chip itself, rather than, or in addition to, the peripheral area, to make such circuit changes. In such a scheme it becomes necessary to selectively remove solder or braze from the original connection pads without disturbing the immediately adjacent areas where fragile connections, such as wire bonds, staple bonds or decals, may be present. Additionally, if the redundant connection pads are deposited with a layer of gold, it may be desirable to prevent solder or braze from depositing over the gold or dissolving the gold during rework.

The ability to selectively remove solder or braze from a surface is similarly desirable for making changes to any electronic circuit substrate which uses surface-mounted IC's, components or wiring, for example, epoxy-based electronic cards.

A variety of devices for removal of solder or braze from electronic substrates have been previously disclosed. The disclosed devices can be classified by two approximate categories, the first being flat-surface blocks for the solder or braze removal, and the second being wicks for the removal of solder or braze from the surface of an electronic substrate.

Within the flat-surface block category, for example, is disclosed a tinned copper slug for module reworking, "Use of a Tinned Copper Slug for Module Reworking", IBM Technical Disclosure Bulletin, Vol. 24, No. 7A, p. 3481 (December 1981). A tinned copper slug is applied to a substrate and the tinned copper slug absorbs melted solder by capillary action as the substrate is heated.

Also disclosed in the flat-surface block category is a porous copper block having solid plated studs, "Chip Rework on Multilayer Ceramic Recess", IBM Technical Disclosure Bulletin, Vol. 27, No. 10B, p. 6344 (March 1985). A porous copper block having solid plated studs is placed on a substrate, such that the solid plated studs enter substrate recesses where excess solder is located. As the copper block is pushed down, the solid plated studs are forced into the recesses, the excess solder is then pushed outwardly and it is then absorbed by the base portion of the porous copper block.

Several variations of wicks capable of absorbing solder by capillary action have been disclosed. For example, U.S. Pat. No. 4,164,606 discloses a wick formed by braiding strands of copper that have been individually coated with solder. U.S. Pat. No. 4,323,631 discloses a wick formed from strands of non-metallic material which are coated with metal and flux to render the fibers more capable of wetting. U.S. Pat. No. 4,416,408 discloses a wick comprised of an open mesh of strands.

Several methods for making porous metal devices have been previously described. Disclosed in IBM Technical Disclosure Bulletin, Vol. 25, No. 5, p. 2285 (October 1982), is a method for making porous metal devices which employs a single sintering step. A mold is filled with copper powder, vibrated, covered and heated to a temperature of 890 degrees Celsius in an atmosphere of disassociated ammonia. After cooling, the copper devices, which have undergone approximately 10 percent shrinkage, are removed from the mold. U.K. Patent No. 661,780 discloses a strikingly similar process for making porous metal molds to be used to make pottery and wood fiber egg trays.

Australian Patent No. 162,811 also discloses a method for making porous metal devices. Spherical particles are used which have a metal coating that is softer than the core metal and preferably alloyable with the core metal. The particles are compressed into a briquette, such that the softer coating is distorted and holds adjacent particles together. The briquette is then sintered such that the softer coating alloys with the harder core.

U.S. Pat. No. 2,219,423 discloses a method for forming porous metal articles of a complex shape. Flat briquettes are placed over a mold having a complex shape. The mold cover which may have a shape that matches the mold is placed over the briquette before sintering. During sintering the weight of the mold cover presses the briquette until it conforms to the shape of the mold.

BRIEF SUMMARY OF THE INVENTION

Disclosed according to the invention is a porous metal block for selectively removing solder or braze from a substrate. The porous metal block comprises at least one protrusion capable of absorbing solder or braze through capillarity. Also disclosed is a sintering process for making the block employing two sintering steps. A mold is filled with metal powder and presintered (partially sintered) to form a presintered porous metal block strong enough for subsequent processing. The presintered porous metal block is then ejected from the mold and fully sintered at a higher temperature.

In one aspect the invention comprises a structure for the selective removal of solder or braze from a substrate comprising, a porous metal block, said block having at least one surface having at least one protrusion for the selective removal of said solder or braze.

In another aspect the invention comprises a process for making a molded porous metal block for the removal of braze or solder from a substrate comprising the steps of:

a) Filling a mold block with a metal powder mixed or coated with a sintering retardant;

b) Presintering said mold block to a temperature high enough to cause weak bonding between said metal powder particles, but low enough to avoid shrinkage so as to form a presintered porous metal block;

c) Ejecting said presintered porous metal block from said mold block;

d) Placing said presintered porous metal block onto a sintering tile; and e) Sintering said presintered porous metal block at a temperature high enough to complete bonding between said powder metal particles so as to form a fully sintered porous metal block.

In still another aspect the invention comprises a process for making a molded porous metal block for the selective removal of braze or solder from a substrate, said block having at least one surface having at least one protrusion for the selective removal of said solder or braze, comprising the step of:

a) Filling a mold block having a mold cavity, wherein the surface opposite the filling surface of said mold cavity has at least one protrusion, cavity with a metal powder mixed or coated with a sintering retardant;

b) Presintering said mold block to a temperature high enough to cause weak bonding between said metal powder particles, but low enough to avoid shrinkage so as to form a presintered porous metal block;

c) Ejecting said presintered porous metal block from said mold block;

d) Placing said presintered porous metal block onto a sintering tile; and e) Sintering said presintered porous metal block at a temperature high enough to complete bonding between said powder metal particles so as to form a fully sintered porous metal block.

OBJECTS OF THE INVENTION

It is an object of this invention to provide a porous metal block having protrusions which selectively remove solder or braze from a substrate by capillary action.

It is another object of this invention to provide a process for making a porous metal block for the removal of solder or braze from a substrate by filling a mold with metal powder, presintering (partially sintering) the powder, and free sintering the ejected presintered porous metal block.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention may be best understood by the description which follows, taken in conjunction with the accompanying drawings in which:

DETAILED DESCRIPTION OF THE INVENTION

Figure 1:
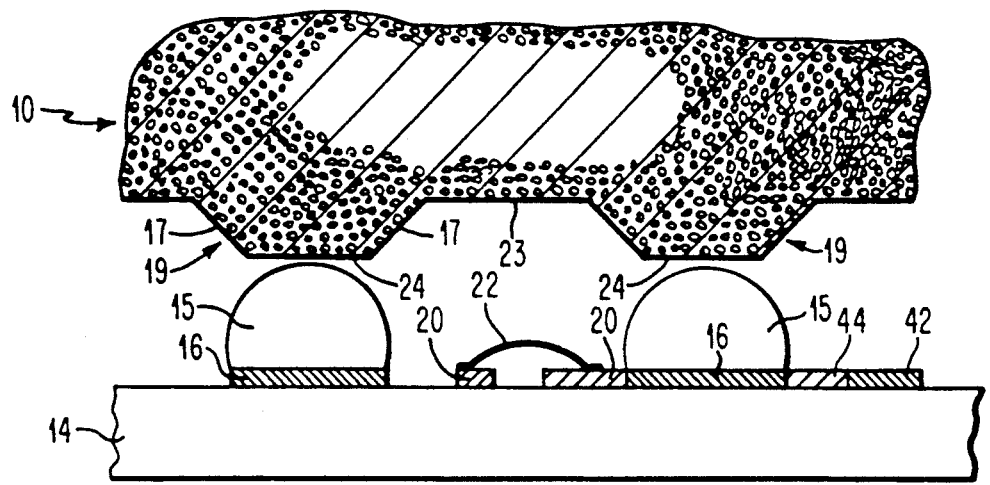
FIG. 1 is a cross-sectional view of a patterned porous metal block as it is applied to an electronic substrate.

Referring to FIG. 1, disclosed according to the invention is a porous metal block 10, hereinafter referred to as the block 10. The preferred metal material for the block 10, is copper, but any metal that is easily wettable by solder or braze is also suitable, for example, copper-based alloys, nickel and nickel-based alloys. The block 10, has an interconnected and uniform porosity. Interconnected porosity means that adjacent pores overlap each other such that the pores form a network through the block, enabling solder or braze to be absorbed by capillarity. Uniform porosity ensures uniform absorption across the block surface.

With continued reference to FIG. 1, the block 10, is comprised of one or more protrusions 19, for the selective removal of solder or braze from a substrate 14. The substrate 14, can be a single layer substrate or a multilayer substrate. The substrate 14, could also be made from ceramic, glass-ceramic or any other suitable substrate material. The substrate 14, normally has on its upper surface, passive electronic components, such as, resistors or capacitors or lines, or active electronic components, such as IC's (not shown in FIG. 1). Solder/braze sites 16, are areas on substrate 14, that require the removal of solder or braze 15. Solder or braze 15, may be in any of various forms, for example, a ball, a mound, as shown in FIG. 1, a line or a plateau. This removal could be part of a rework procedure. Sites 20, are areas on the substrate 14, effecting circuit changes that do not require solder or braze removal and may have fragile features, such as, bonded wire 22, that are easily damaged if disturbed. Alternatively, sites 20 may have solder or braze (not shown) that does not need to be removed. The redundant connection pad 42, if contiguous with its adjacent delete line 44, permits additional connections to be made to the solder/braze site 16 adjacent to the delete line 44. The delete line 44, may be severed to eliminate such connections. For the sake of clarity the additional connections are not shown in FIG. 1. If the redundant connection pad 42, the delete line 44, or any other connection pad or line is deposited with a thin layer of gold for better conductivity, it may be harmed by direct contact with the block 10. For example, if the block 10, directly contacts the redundant connection pad 42, or the delete line 44, the solder or braze 15, may spread to the delete line 44, or the redundant connection pad 42, as it melts. Such spreading may partially or completely dissolve any gold present such that additional connections made by the redundant connection pad 42, are less conductive or otherwise damaged.

To remove solder or braze from the substrate 14, the block 10, is applied to the substrate 14, such that the protrusions 19, are aligned with and physically contact solder or braze 15, on solder/braze sites 16. As the substrate 14, or block 10, is heated, the solder or braze 15, melts and is absorbed into the pores of the protrusions 19, of the block 10, by capillary action. The protrusions 19, are kept in physical contact with the solder or braze 15, until all the desired solder or braze 15, is removed through this capillary action. As can be clearly seen in FIG. 1, provisions are made in the block 10, such as having a depression or surface 23, so that sites 20, which are adjacent to solder/braze sites 16, are not contacted by the block 10, and bonded wire 22, and similar such features remain viable. Similarly, the redundant connection pad 42, and the delete line 44, are also not disturbed.

From the preceding explanation of how the block 10, is used a person skilled in the art would recognize that the particular geometries and dimensions that characterize the protrusions 19, are not limited to that shown in FIG. 1 and will vary with the application.

For example, the height of the protrusions 19, may vary with the application and need not be uniform for a given block. For the application shown in FIG. 1, the protrusions 19, are of uniform height and are long enough to obstruct the surface 23, from contacting the sites 20, even as the block 10, advances toward the substrate 14, as a result of absorbing the solder or braze 15. However, in an application having solder/braze sites that are not co-planar it would be desirable to vary the heights of the protrusions in a corresponding manner. That is, a shorter protrusion could be made to contact a solder/braze site that is higher relative to other solder/braze sites. Alternatively, varying protrusion heights can be used to leave a controlled amount of solder/braze residue at solder/braze sites 16.

Similarly, the sidewalls 17, of the protrusions 19, may be profiled in whatever manner is convenient for either the application or the process for making the block. The sidewalls 17, may be completely vertical, curved, tapered, as in FIG.1, or have an irregular profile. However, care in dimensioning the profile of the sidewalls 17, must be taken in order to avoid any possibility of contact with fragile features located in between solder sites, such as the bonded wire 22, shown in FIG. 1.

The face 24, of the protrusions 19, as shown in FIG. 1 are preferably flat for the preferred embodiment, but may also be convex, concave or any other shape depending upon the application.

Figure 2:
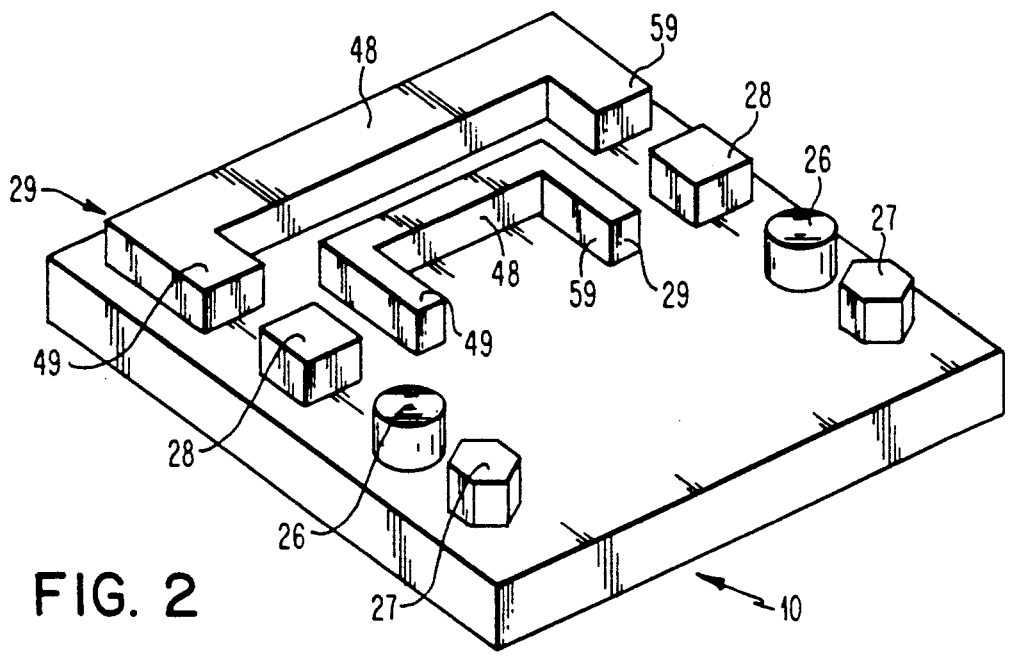
FIG. 2 is a perspective view of a porous metal block showing an example of a plurality of protrusion patterns.

The shape of the protrusions 19, may also vary with the application. FIG. 2, for example, shows a variety of shapes for the protrusions such as the circular protrusion 26, the polygonal protrusion 27, the rectangular protrusion 28, and the miscellaneously shaped protrusion 29. The miscellaneously shaped protrusion 29 are odd and irregular shaped protrusions and one such example is shown in FIG. 2, having a trunk segment 48, joined to the two legs 49 and 59, which have similar or dissimilar features. The number of shapes that could be used is infinite and is not limited by the shapes herein described.

Likewise, the pattern formed by the block protrusions may vary with the application. The pattern formed by the protrusions normally corresponds to the pattern of solder/braze sites on the substrate. The preferred pattern is a rectilinear array, but the invention is not limited to that embodiment. For example, FIG. 2 illustrates a pattern comprising several shapes of protrusions arranged in a symmetric pattern. The pattern could also be asymmetric, periodic, or completely irregular. As with the protrusion shape the number of patterns that could be used is infinite.

Figure 3:
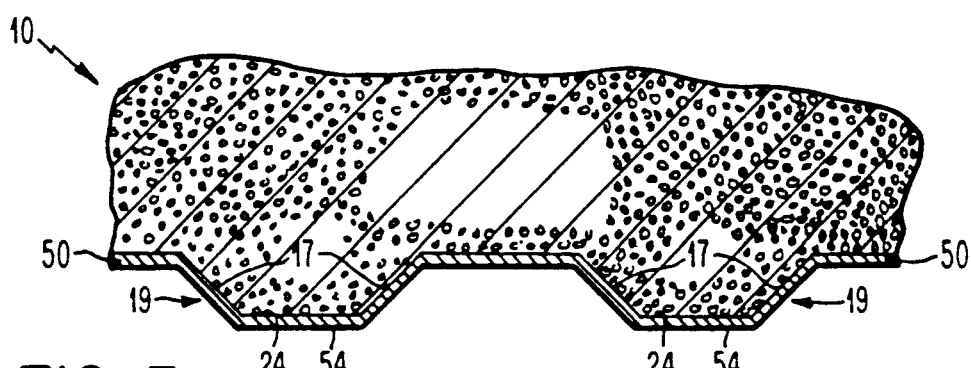
FIG. 3 is a cross-sectional view of a porous metal block coated with a compatible material.

For improved wettability of solder or braze to the block 10, the block 10, may optionally be coated with any compatible material 50, such as a low-melting solder, as is shown in FIG. 3. The coating 50, may cover the entire surface of the block 10, having protrusions 19, or may cover just the face or surface 24, of the protrusions 19, and form the face 54, that physically contacts the solder/braze 15.

Figure 4A:
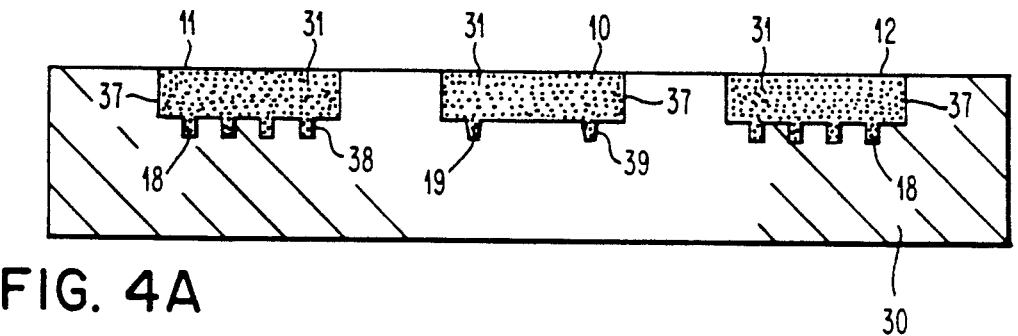
FIG. 4A, 4B and 4C illustrate the process for making the porous metal block of this invention.
Figure 4B:
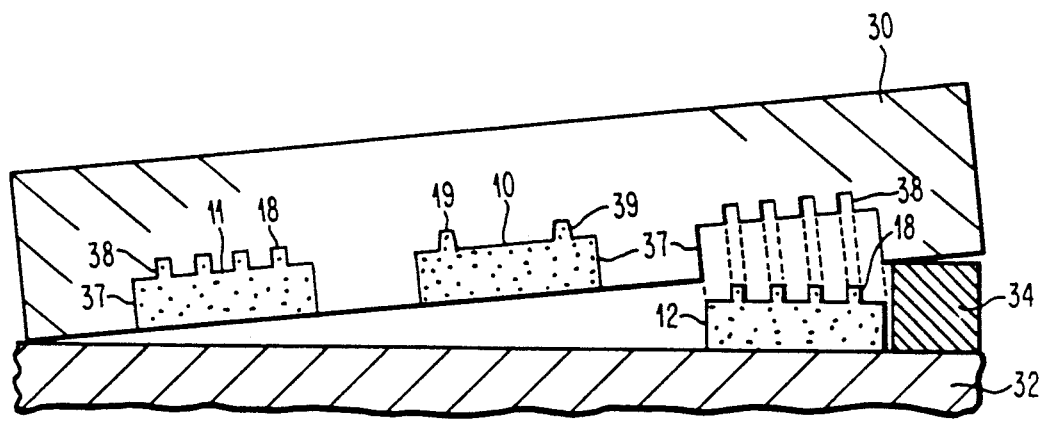
Figure 4C:
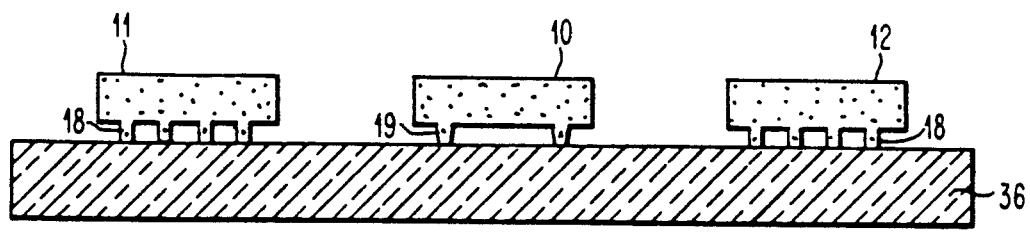

Also disclosed is the process for making the block 10, 11 or 12, as shown in FIGS. 4A, 4B, and 4C. The blocks 10, 11 or 12, that are made by using this process, need not be uniform and are shown in FIGS. 4A, 4B, and 4C as being physically different. For example, the blocks 11 and 12, have protrusions 18, that are at a right angle to the base of the block, while the block 10, has tapered protrusions 19. Hereinafter, reference to the block 10, will denote the blocks 11 and 12, as well.

The mold block 30, is first filled with fine metal powder 31. Copper powder is preferred, but other metals which readily wet to solder or braze, such as nickel, nickel-based alloys or copper-based alloys would be suitable as well. The fine metal powder 31, is preferably pre-mixed or coated with a sintering retardant, such as alumina, oxides or organic retardants, enabling intervention at the desired point of the presintering step. Other additives may be desirable as well, such as zinc, tin or lead, to control sintering behavior, strengthen the finished product, or obtain a desired pore morphology.

The mold block 30, should be made of a material to which the fine metal powder 31, will not adhere, for easier removal of the block 10, from the mold block 30. A mold block made from graphite is preferred for molding copper powders. It may also be desirable for the mold block 30, to be made of a material having a thermal coefficient of expansion near that of the material to be molded to prevent stresses from being applied to the block 10, during pre-sintering.

The mold cavity 37, having the individual uniform mold segments 38, and individual tapered mold segments 39, of the mold block 30, as desired, should be sized to account for a controlled amount of linear shrinkage that will occur in later process steps to the blocks 10, 11 and 12, being formed. A final dimension of L on the block and an expected linear shrinkage of S percent would require a mold dimension of $L \times (100/(100-S))$. For example, to achieve a final dimension of 36 microns when 10 percent linear shrinkage is expected, the mold dimension should be $36 \times (100/90) = 40$ microns.

The mold block 30, is filled by pouring the fine metal powder 31, into the mold block 30, and tapping the mold block 30, to cause the fine metal particles of the metal powder 31, to settle as is shown in FIG. 4A. Excess powder 31, may be removed by moving a straight edge across the top of the mold block 30, and scraping off the excess powder 31. The mold block 30, may optionally be vibrated to ensure consistent or uniform packing density and elimination of voids. Consistent packing is important to obtain the desired interconnected porosity of the finished block, referred to above in the discussion of the porous metal block. The vibration may be performed by mechanical means, ultrasonic means or a combination of both.

The filled mold block 30, is next heated to form a presintered block. The presintering temperature is determined experimentally and varies with the type, shape, and size of the metal powder used as well as any additives or coatings accompanying the fine metal powder 31. The presintering temperature should be low enough that only negligible shrinkage occurs but high enough to form a weakly sintered block. Too high a temperature tends to cause substantial shrinkage which can result in the protrusions 18, 19 being severed from the block. Too low a presintering temperature does not cause enough bonding between metal powder particles to produce a block 10 strong enough for subsequent processing.

It is preferable that the presintering step be performed in a reducing atmosphere. A reducing atmosphere prevents oxides from forming in the block 10, which may weaken the block or hinder the ability of solder or braze to wet to the block.

The presintered block 10, is next ejected from the mold block 30, onto a release table 32, as illustrated in FIG. 4B. This may be done by resting one edge of the mold block 30, on a release edge 34, such that the mold cavities 37, face down. Then by gently tapping the mold block 30, the presintered block 10, is ejected. Care should be taken in handling the fragile block at this stage. The force required to eject the presintered block should be minimal. It would be obvious to a person skilled in the art that ejection of a presintered block could be made easier by use of a mold cavity 37, having individual tapered mold segments 39, as shown in FIG. 4B. The taper for the mold segment 39, should be formed such that the cross-sectional area of the mold segment 39, forming the tapered protrusions 19, decreases from the base of the mold cavity as the depth of the mold segment 39, increases.

The ejected presintered block is next placed on a sintering tile 36, having a flat surface, in preparation of the final sintering step. The sintering tile 36, is preferably gas permeable. Although the block may be oriented on the sintering tile 36 in any convenient manner, in practice, certain orientations have resulted in less warpage than others. Warpage may make the block less effective in removing solder or braze from a substrate. The preferred orientations for minimal warpage are those which do not permit the flat block surface opposite the protrusions to contact the sintering tile 36. For example, the block 10, may be placed on the sintering tile 36, with the protrusions 18 and 19, in direct contact with the sintering tile 36, as shown in FIG. 4C. Alternatively, the block may be suspended on pins above the sintering tile with the protrusions facing up or down. An additional means for insuring flatness of the block 10, is by placing a weight evenly across the upper surface of the block.

Next the block is sintered on the sintering tile 36. The sintering temperature should be sufficiently high to obtain a controlled amount of linear shrinkage and impart to the block the desired strength. Because the block is no longer confined by the mold block 30, the protrusions 18, 19, remain intact even as the block 10 shrinks. As with the presintering temperature, the sintering temperature is determined experimentally and depends upon the properties of the metal powder and additives used to create the presintered block as well as the degree of linear shrinkage desired.

As with the presintering step, it is preferable that the sintering step be performed in a reducing atmosphere. A reducing atmosphere prevents oxides from forming in the block which may weaken the block or hinder the ability of solder or braze to wet to the block.

Other processes may also be used to make a porous metal block 10, having protrusions 18, 19, for selective solder or braze removal. For example, various secondary processing techniques, such as coining, chemical etching, or cutting, may be performed on a flat preformed porous metal block in order to form the protrusions 18, 19, needed for selective solder removal.

In coining, the die would have a negative relief of the desired pattern of protrusions. Low coining pressures would be preferred to maintain porosity. Use of a double-acting floating die, which applies coining pressure evenly on two sides of the block rather than only on one, and lubrication on the edge of the die walls may decrease pressure gradients and result in more uniform protrusions.

In chemical etching, standard photolithographic techniques could be employed to etch away the areas where protrusions are not desired.

In cutting, a sawing or milling machine could be used to form, for example, a series of orthogonally formed grooves resulting in a grid-like pattern. The raised portions between the grooves would become the protrusions for solder or braze removal.

Optionally, the sintered block 10, may be coated with a compatible material 50, such as a eutectic solder. The coating 50, may cover the entire block 10, or the side of the block 10, having protrusions 18, 19, or at least a portion of just the protrusions 18, 19. The coating 50, serves several purposes. First, it improve wettability between the block 10, and solder or braze 15. Secondly, it prevents flaking of loose metal particles from the block 10, onto the substrate 14, that is being site dressed. Lastly, it inhibits intermetallic growth which may be caused by traces of metal from the block 10, remaining on the electronic substrate after solder has been removed. This may happen if the metal from the block diffuses from the block 10, into the solder or braze 15, being removed and remains with the residual solder or braze left on the electronic substrate.

EXAMPLES

The following examples are intended to further illustrate the invention and are not intended to limit the scope of the invention in any manner.

EXAMPLE 1

A porous copper block was formed as follows. A graphite mold block was filled with spherical copper powder particles which were pre-mixed with alumina. The copper powder particles were nominally 5 microns in diameter and ranged from 2 to 12 microns in diameter. The filled mold block was presintered at 675 degrees Celsius until the copper powder particles were weakly sintered. The presintering temperature is normally in the range of between 625 and 725 degrees Celsius, and is preferably in the range of between 650 and 700 degrees Celsius. Shrinkage due to the presintering step was negligible. The presintered copper block was gently ejected from the mold and placed on a sintering tile with the protrusions in contact with the sintering tile. The presintered copper block was then sintered at 730 degrees Celsius until the copper block reached the desired strength. The sintering temperature is normally in the range of between 680 and 780 degrees Celsius, and is preferably in the range of between 705 and 755 degrees Celsius.

EXAMPLE 2

A porous copper block was formed as follows. A graphite mold block was filled with spherical copper powder particles which were pre-mixed with tin and lead for enhanced strength of the finished block. The copper powder particles were nominally 28 microns in diameter and ranged from 10 to 75 microns in diameter. The filled mold block was sintered at 600 degrees Celsius until the copper powder particles were weakly sintered. The presintering temperature is normally in the range of between 550 and 650 degrees Celsius, and preferably in the range of between 600 and 640 degrees Celsius. Shrinkage due to the presintering step was negligible. The presintered copper block was gently ejected from the mold and placed on a sintering tile with the protrusions in contact with the sintering tile. The presintered copper block was then sintered at 650 degrees Celsius until the copper block reached the desired strength. The sintering temperature is normally in the range of between 600 and 700 degrees Celsius, and is preferably in the range of between 640 and 670 degrees Celsius.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A structure for the selective removal of solder or braze from a substrate comprising, a porous metal block, said block having at least one surface having at least one porous protrusion for the selective absorption of said solder or braze.

2. The structure of claim 1, wherein the material for said porous metal block is selected from a group comprising copper, nickel, nickel-based alloys, and copper-based alloys or any other metal that is wettable by solder or braze.

3. The structure of claim 1, wherein said protrusion is selected from a group comprising rectangular protrusion, circular protrusion, polygonal protrusion or any irregular shaped protrusion.

4. The structure of claim 1, wherein said surface having said protrusion is coated with a compatible material, wherein said compatible material is a material that wets said porous metal block.

5. The structure of claim 4, wherein said compatible material is a low-melting solder.

6. The structure of claim 1, wherein at least a portion of at least one said protrusion that comes in physical contact with said solder or braze on said substrate is coated with a compatible material, wherein said compatible material is a material that wets said porous metal block.

7. The structure of claim 6, wherein said compatible material is a low-melting solder.

8. The structure of claim 1, wherein at least one of said protrusions has a tapered profile.

9. The structure of claim 1, wherein said structure has interconnected porosity.

* * * * *

UNITED STATES PATENT AND TRADEMARK OFFICE
CERTIFICATE OF CORRECTION

PATENT NO. : 5,284,286

DATED : February 8, 1994

INVENTOR(S) : Peter J. Brofman, Shaji Farooq, Kathleen A. Lidestri, Gregg B. Monjeau, and Karl J. Puttlitz It is certified that error appears in the above-identified patent and that said Letters Patent is hereby corrected as shown below:

On the title page, item [54], in the title, the word "SUBSTATE" should be deleted and -- SUBSTRATE -- should be inserted therefor.

In Column 1, Line 2, in the title, please delete "SUBSTATE" and insert therefor -- SUBSTRATE --.

Signed and Sealed this

Twenty-seventh Day of September, 1994

Attest:

BRUCE LEHMAN

Attesting Officer

Commissioner of Patents and Trademarks